No. 751,294. PATENTED FEB. 2, 1904.
A. T. M. JOHNSON.
APPARATUS FOR ELECTRICALLY TRANSMITTING AND RECEIVING MESSAGES.
APPLICATION FILED JUNE 6, 1902.

NO MODEL. 10 SHEETS—SHEET 1.

*Fig. 1.*

Witnesses.                                   Inventor.

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.
NO MODEL. 10 SHEETS—SHEET 3.

Witnesses.
Henry A. Brougham.
W. Cross

Inventor:
A. T. M. Johnson

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.
NO MODEL. 10 SHEETS—SHEET 4.

Witnesses
Henry A Brougham
W. Cross

Inventor:
A. T. M. Johnson

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.

NO MODEL. 10 SHEETS—SHEET 5.

Witnesses.
Henry A. Brougham
W. Cross

Inventor.
A. T. M. Johnson

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.

NO MODEL. 10 SHEETS—SHEET 6.

Witnesses.
Henry A. Brougham
W. Cross

Inventor.
A. T. M. Johnson

No. 751,294. PATENTED FEB. 2, 1904.
A. T. M. JOHNSON.
APPARATUS FOR ELECTRICALLY TRANSMITTING AND RECEIVING MESSAGES.
APPLICATION FILED JUNE 6, 1902.
NO MODEL. 10 SHEETS—SHEET 7.

Witnesses
Henry A. Brougham
W. Cross

Inventor:
A. T. M. Johnson

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.

NO MODEL. 10 SHEETS—SHEET 8.

Witnesses.
Henry A. Brougham.
W. Cross

Inventor.
A. T. M. Johnson

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.
NO MODEL. 10 SHEETS—SHEET 9.

No. 751,294. PATENTED FEB. 2, 1904.
A. T. M. JOHNSON.
APPARATUS FOR ELECTRICALLY TRANSMITTING AND
RECEIVING MESSAGES.
APPLICATION FILED JUNE 6, 1902.
NO MODEL. 10 SHEETS—SHEET 10.

Witnesses.
Henry A. Brougham.
W. Cross

Inventor.
A. T. M. Johnson

No. 751,294. Patented February 2, 1904.

UNITED STATES PATENT OFFICE.

ARTHUR THOMAS METCALF JOHNSON, OF HIGHBURY, ENGLAND, ASSIGNOR TO HIMSELF, AND EDWIN JOSEPH RICHARDSON, OF LONDON, ENGLAND.

APPARATUS FOR ELECTRICALLY TRANSMITTING AND RECEIVING MESSAGES.

SPECIFICATION forming part of Letters Patent No. 751,294, dated February 2, 1904.

Application filed June 6, 1902. Serial No. 110,517. (No model.)

*To all whom it may concern:*

Be it known that I, ARTHUR THOMAS METCALF JOHNSON, a subject of the King of Great Britain and Ireland, residing at Highbury, in the county of Middlesex, England, have invented Improvements in Means or Apparatus for Electrically Transmitting and Receiving Messages, of which the following is a specification.

This invention has reference to improvements in the system of harmonic telegraphy, according to which there is used a transmitting instrument comprising an electromagnetic device, such as an induction-coil, a Morse key or like circuit-controller, and two sets of reeds, respectively called "tuning-reeds" and "speaking-reeds," the tuning-reeds being each constructed to vibrate at a definite rate or pitch differing from that of the other tuning-reeds and the speaking-reeds being each arranged in proximity to a tuning-reed and mounted so that it can be brought into proximity to the electromagnetic device, so that in conjunction therewith and an adjustable contact-screw it can be caused to act as an automatic vibrating contact maker and breaker whereby the circuit of the electromagnetic device can be opened and closed in a rapid and automatic manner and electrical impluses having a definite rate can be transmitted either wholly through metal conductors or partly through metal conductors and partly through earth or water or earth and water to receiving instruments, each of which is provided with one or more electromagnetic devices adapted to be energized by the transmitted electrical impulses or vibrations and one or more musical vibrators tuned to vibrate and produce a musical sound only when vibrated at a definite rate or pitch by the corresponding electromagnetic device or devices, the arrangement being such that when a speaking-reed in the transmitting instrument is caused by suitable adjustment to vibrate at a rate corresponding to the pitch of the musical vibrator or vibrators in one or other of the receiving instruments such fact will be indicated by the corresponding tuning-reed of the transmitting instrument being automatically and sympathetically set in vibration, and electrical impulses will then be transmitted having a corresponding definite rate, which will only affect that receiver or receivers whose musical vibrator or vibrators is or are tuned to vibrate at that particular rate, a message being sent by suitably operating the Morse key or equivalent circuit-controlling device.

Now the present invention has for object to enable a general telegraphic message to be sent simultaneously to all the receiving instruments of a group of receiving instruments of the type referred to and also a particular or secret message to any one or more but not all of such receiving instruments. It also has for object to improve the construction and working of harmonic telegraphic apparatus of the kind hereinbefore referred to and to adapt the telegraphic apparatus for sending telephonic messages.

The invention consists for these purposes in various novel features of construction and in combinations and arrangements of parts, all as hereinafter described, and pointed out in the claims.

In the accompanying illustrative drawings, Figs. 13, 14, 15, 16, 17, 18, 19, and 20 are diagrams hereinafter referred to. Fig. 21 shows in cross-section an ordinary telephonic receiver of watch form.

Figure 1:
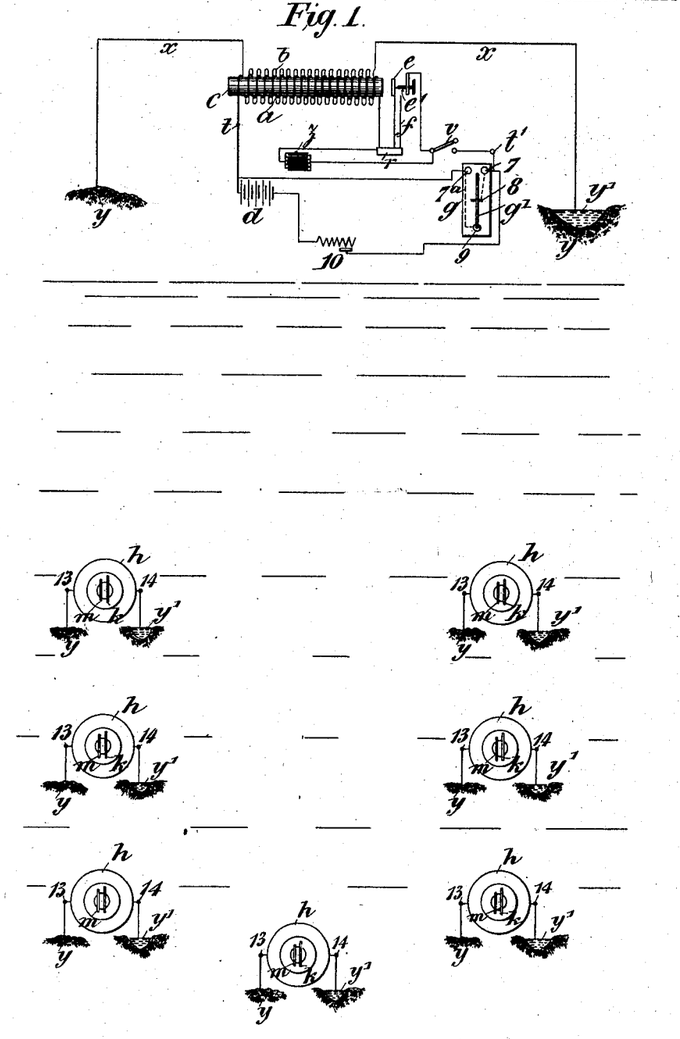
Figure 1 is a diagram showing means or apparatus for electrically transmitting and receiving messages according to this invention.

To enable a general telephonic message to be sent simultaneously to all the receiving instruments of a group of such instruments and also a particular or secret message to any one or more but not all of such instruments, there are used, in conjunction with a transmitting instrument comprising, for example, as shown in Fig. 1, an induction-coil having a primary winding $a$, a secondary winding $b$, and an iron core $c$, an electric generator $d$ in circuit with the primary winding $a$, means, such as a vibrating armature $e$ and contact $e'$, for rapidly making and breaking the circuit of the primary winding $a$ at different desired rates, means, such as a reed $f$, for giving an audible indication when any particular rate of make and break is attained, and a circuit-controller, such as a Morse key $g$, a number of receiving instruments $h$ of the type referred to, each of which is provided with two vibrators $k$ and $m$, one of which—viz., $k$—is tuned to vibrate at a rate common to all the receiving instruments and is hereinafter called for distinction the "master-reed," and the other—viz., $m$—at a different rate specific to the particular receiving instrument, the latter reed being hereinafter called for distinction the "secret-message" reed. The arrangement is such that by causing the movable part $e$ of the circuit making and breaking device $e\ e'$ of the transmitting instrument to vibrate at the common rate, which will be indicated by the audible indicator $f$ being then brought automatically into action, electrical impulses will be set up in the secondary winding $b$ and be transmitted therefrom through the earth to all the receiving instruments $h$, all the master-reeds $k$ of which will be caused to sound, and by operating the circuit-controller $g$ a message can be sent simultaneously to all the receiving instruments $h$, and when it is desired to send a special or secret message to one or some, but not all, of the said receiving instruments the circuit maker and breaker $e\ e'$ is readjusted so as to cause the movable part $e$ thereof to vibrate at a rate corresponding to the pitch of the secret reed $m$ of that particular receiving instrument or instruments, so that that particular reed or reeds only will be actuated, whereupon a message can be sent thereto by suitably manipulating the circuit-controller $g$.

The arrangement just described is specially advantageous for use with a squadron of warships, a transmitting instrument and a receiving instrument being located on each ship, and also, it may be, on land, so that both general and secret messages can be exchanged between each ship and all the remaining ships, and, it may be, between land and each ship and each ship and land.

Figure 2:
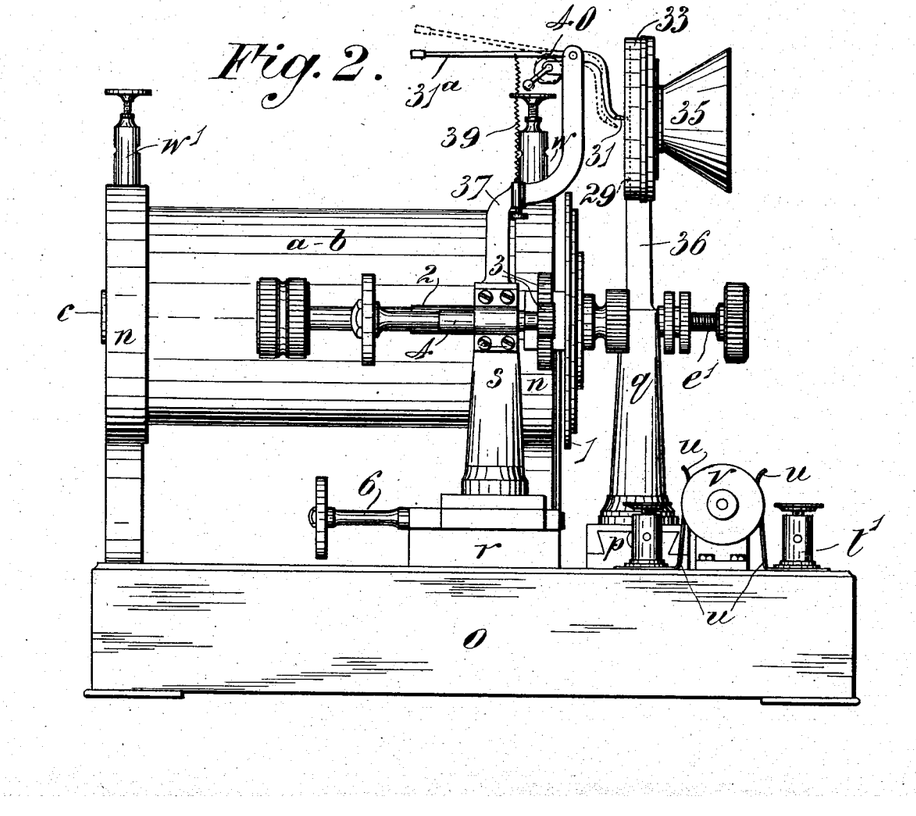
Figs. 2, 3, and 4 show, respectively, in side elevation, front elevation, and plan a transmitting instrument adapted for sending telegraphic and telephonic messages according to this invention.
Figure 3:
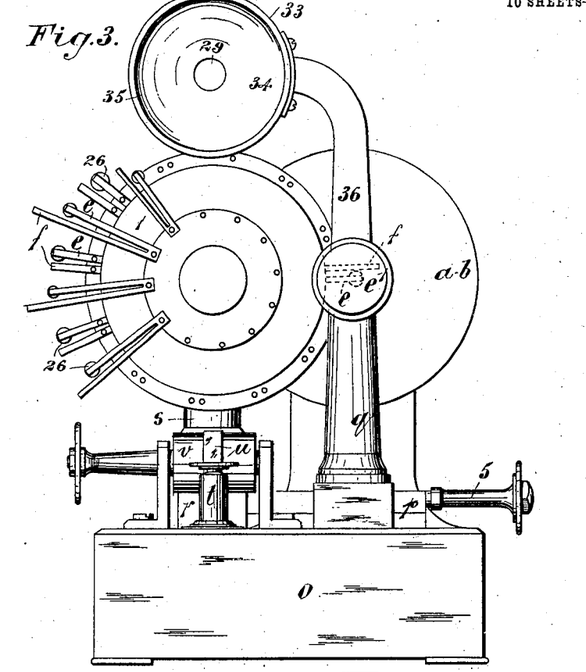
Figure 4:
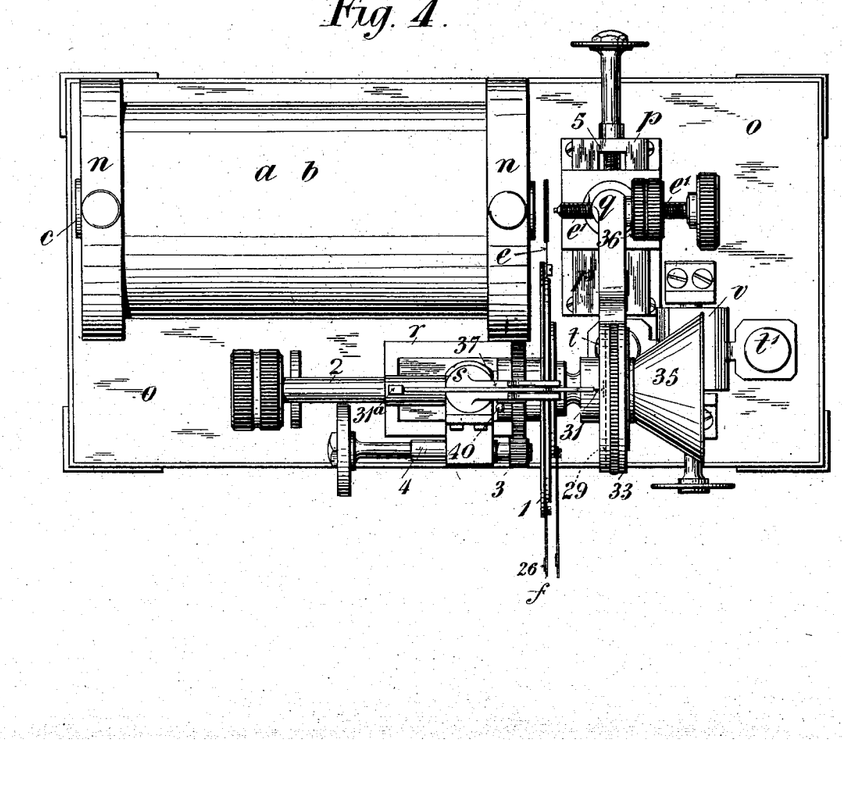

Apparatus of the kind described can be constructed in various forms. Conveniently each transmitting instrument comprises, as shown in Figs. 2, 3, and 4, an induction-coil $a\ b\ c$, mounted in standards $n$, fixed on a base $o$, upon which is also fixed a transversely-arranged metal support $p$, carrying a vertical pillar $q$, and also a longitudinally-arranged metal support $r$, carrying a second vertical pillar $s$. One end of the primary winding of the coil is connected to a terminal $t$, and the other end is connected, through the support $r$, pillar $s$, a speaking-reed $e$, carried by the pillar $s$, an adjustable contact-screw $e'$, carried by the pillar $q$, and support $p$, to a contact-spring $u$, that can be placed in connection with a second terminal $t'$ by means of a rotary switch $v$, the two terminals $t\ t'$, when the apparatus is to be used, being connected to an electric generator $d$, Fig. 1. The two ends of the secondary winding of the coil are connected to two terminals $w\ w'$, which, when the apparatus is to be used, are connected by conductors $x$ to earth, or, as shown in Fig. 1, one direct to earth $y$ and the other direct to a body of water $y'$ in contact with the earth, or when the apparatus is used on board ship both connected to the water external to the ship. For producing the electrical impulses in the secondary circuit there is employed a tunable musical trembler or multiphone of the kind shown in Figs. 2, 3, and 4, which comprises a rotary metal disk 1, to which are fixed a number of differently-tuned pairs of reeds $e\ f$, the reeds $e$ constituting the speaking-reeds and the reeds $f$ constituting the tuning-reeds, by means of which it can be determined when the rate of pulsations being sent to the receiving instruments corresponds with the rate of vibration of the particular tuning-reed $f$ in use. Only a few pairs of the reeds $e\ f$ are shown in Figs. 2, 3, and 4 in order to prevent complication of these figures. The reed-disk 1 is fixed to a shaft 2, journaled in the pillar $s$, and is arranged to be rotated to bring any desired pair of reeds $e\ f$ into position for use by gearing 3, operated by a spindle 4. The pillar $q$, with adjustable contact-screw $e'$, can be moved on its support $p$ in a direction transverse to the axis of the coil by an adjusting-screw 5, and the pillar $s$, with the multiphone, can be moved on the support $r$ in a direction parallel to the coil by an adjusting-screw 6. A key $g$, Fig. 1, such as a Morse key, is employed for alternately placing the primary winding $a$ of the coil in shunt and main circuit with the electric generator $d$ when sending telegraphic messages, for which purpose one terminal 7 of the key is connected to one pole of the electric generator $d$, to the bearing 8 of the key-lever $g'$, and to the terminal $t'$ of the transmitting instrument and the other terminal 7ª of the key is connected to the other terminal of the electric generator $d$ and to the contact 9, above and away from which the key-lever $g'$ is normally held by a spring in the usual manner. The arrangement is such that when the key-lever $g'$ is in its normal position current can pass to the terminal $t'$ and primary winding $a$; but upon depressing the key-lever, so as to bring it into connection with the contact 9, the battery will be short-circuited through the terminal 7ª without breaking the circuit of the primary winding $a$. A rheostat 10 may be placed in the circuit of the primary winding $a$ for varying the strength of the current flowing therethrough, so as to prevent any liability of the speaking-reed $e$ being burned by too large a current and to suit varying requirements.

Figure 6:
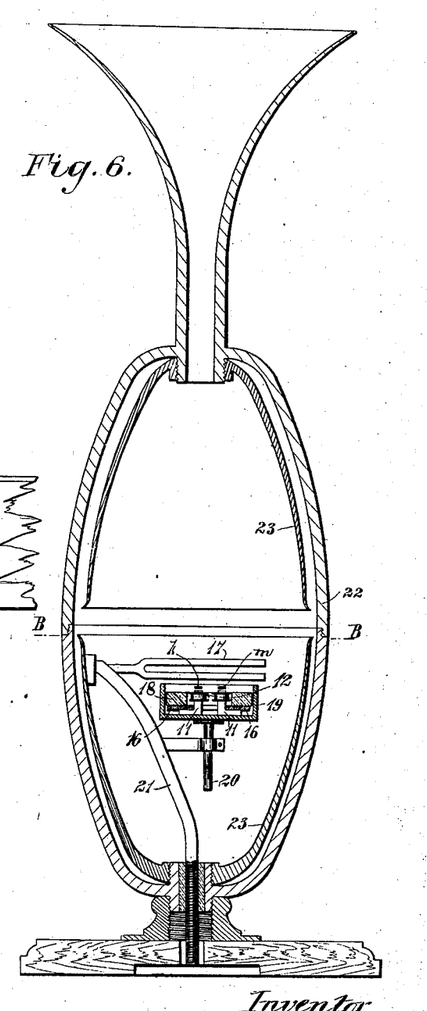
Figs. 6 and 7 show a receiving instrument according to this invention, Fig. 6 being a section on the line A A of Fig. 7, and Fig. 7 a section on the line B B of Fig. 6.
Figure 7:
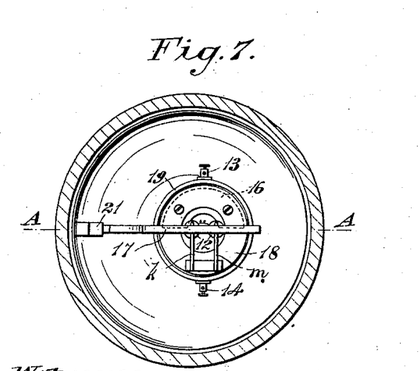

The two vibrators $k$ $m$ in each receiving instrument $h$, Figs. 1, 6, and 7, may conveniently be two reeds tuned to different pitches and arranged to extend across and at a suitable distance from the poles 11 of an electromagnet, the winding 12 of which has its two terminals 13 and 14 connected to earth or, as shown, one to earth $y$ and one to a body of water $y'$ in connection with the earth or when the receiving instrument is used on board ship both connected to the water external to the ship.

Figure 8:
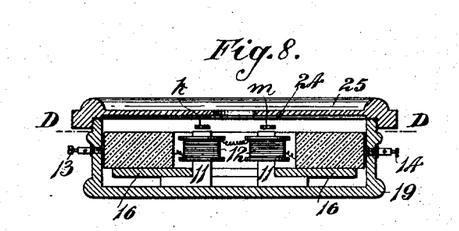
Fig. 8 is a section on the line C C of Fig. 9, Fig. 9 a section on the line D D of Fig. 8, and Fig. 10 a section on the line E E of Fig. 9, showing a modified construction of receiving instrument.
Figure 9:
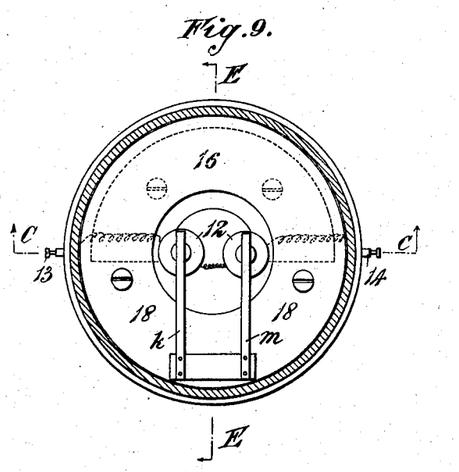
Figure 10:
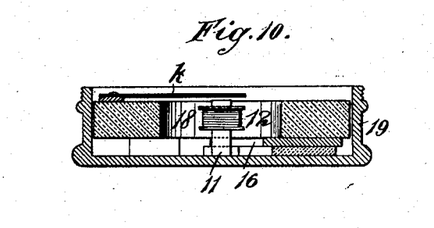

To render the receiving instrument responsive to weak electrical impulses at the pitches corresponding to either of the reeds, the iron core of the electromagnet across the poles 11, of which the master and secret reeds $k$ $m$ extend, may be magnetized by a permanent magnet or magnets 16, Figs. 6 and 7, to an extent nearly but not quite sufficient to attract the said reeds $k$ $m$, which are of magnetic material, so that weak electrical impulses will suffice to furnish the additional necessary energy when supplied at the proper rate to set one or other of the reeds in motion to produce a musical note. Also to increase the sound produced by one or each reed there may be supported across the reeds a larger vibrating device or devices—for example, a tuning-fork 17—corresponding in pitch to one or other of the reeds $k$ $m$, so that it will be set in motion sympathetically by the corresponding reed aided, it may be, by the electromagnet, so as to produce a louder sound than would be produced by either reed alone. The core of the electromagnet may, as in the example shown in Figs. 6 and 7, be made in two parts each provided with a coil 12 wound around one of its polar ends and having a permanent magnet 16 in contact with its other end. The two parts of the core with coils 12 and permanent magnets 16, the two reeds $k$ $m$, and a block 18 of suitable material—for example, vulcanite—to which one end of each reed is rigidly secured, are fixed within a circular box or receptacle 19, that is adjustably supported, by means of a stem 20, on a bar 21, the free end of which carries the tuning-fork 17. The whole may be arranged within a cylinder or casing 22, provided, it may be, with one or more resonant devices, such as bells 23, to increase the sound, or the circular box 19 may, as in the example shown in Figs. 8, 9, and 10, be covered by a perforated or reticulated protecting-diaphragm 24, held in place over the adjustable reeds $k$ $m$ and electromagnetic device 11 12 by a perforated cover 25, so as to resemble in external appearance a telephonic watch-receiver. In this case the larger vibrating device or devices 17, Figs. 6 and 7, is or are dispensed with.

Figure 11:
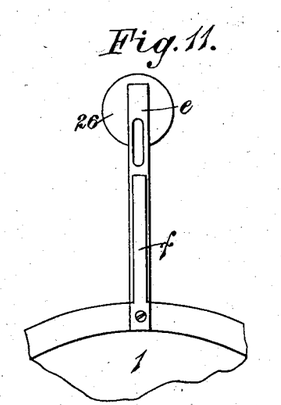
Figs. 11 and 11ª are elevations at right angles to one another, showing part of a modified construction of multiphone according to this invention.
Figure 11A:
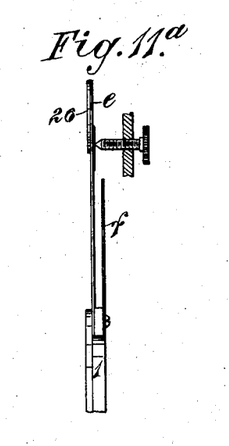
Figure 12:
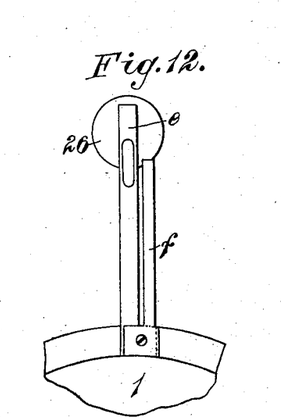
Figs. 12 and 12ª are similar views to Figs. 11 and 11ª, showing a further modified construction of multiphone.
Figure 12A:
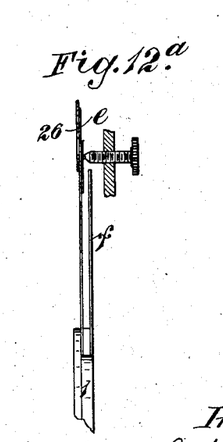

In order to adapt transmitting apparatus of the kind hereinbefore mentioned for use with a large number of different receiving instruments, the two reeds $e$ $f$ of each pair of reeds on the tunable musical trembler or multiphone instead of being fixed side by side in the same plane, as in the arrangement shown in Fig. 3, may be fixed more or less one behind the other or banked, as shown in Figs. 11 and 11ª, where the tuning-reed $f$ is represented as made shorter than and fixed at one end over and at a small distance from the corresponding speaking-reed $e$, or the tuning-reed $f$ may, as shown in Figs. 12 and 12ª, be placed nearer to the corresponding speaking-reed $e$ than in Fig. 3, but in a different plane to such speaking-reed, so as not to interfere with the vibration thereof. The arrangement in each of these modified arrangements is such that a considerable number of pairs of reeds can be fixed to a rotary carrier 1 of moderate dimensions, each speaking-reed $e$ being arranged to be brought opposite the iron core $c$ of the induction-coil $a$ $b$ $c$ of the transmitting instrument and opposite the adjustable contact-screw $e'$, by which its rate of vibration can be varied to suit requirement.

The free end of each speaking-reed $e$ may advantageously be provided with an enlargement of suitable shape—for example, with a thin iron disk 26, Figs. 3, 11, and 12—for the purpose of presenting a large surface to the core $c$ of the induction-coil opposite which it vibrates, and thereby obviating liability of the platinum contacts on the said reed and adjusting-screw sticking and at the same time reducing the number of vibrations of the reed, and thereby facilitating the operation of tuning the speaking-reed to vibrate at the same rate as the corresponding tuning-reed $f$.

It has been found in practice that to obtain the best results it is necessary to use a powerful induction-coil and to place the terminals of its secondary winding in connection with earth or water or earth and water at distances apart not less than about two hundred (200) times the length of the longest spark that can be set up between the secondary terminals of such a coil. It has also been found preferable where possible to place one of the secondary terminals in direct connection with earth $y$ and the other in connection with water $y'$ in contact with earth, as in Fig. 1, as such an arrangement gives better results than are obtained when both terminals are connected to solid earth or both to water.

Figure 13:
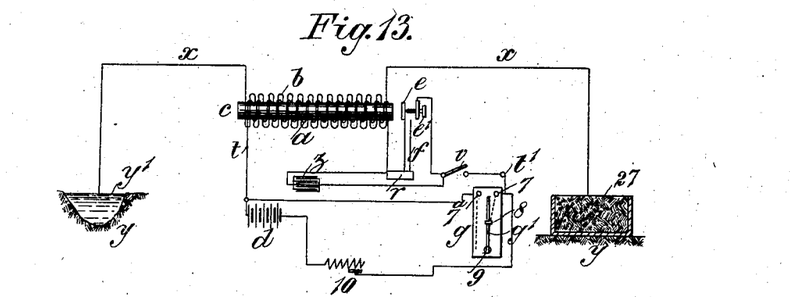
Figure 14:
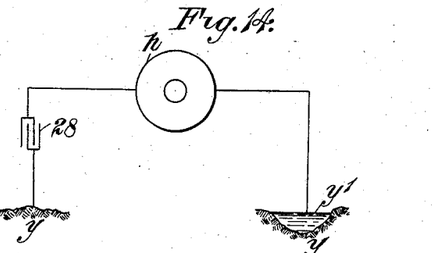
Figure 15:
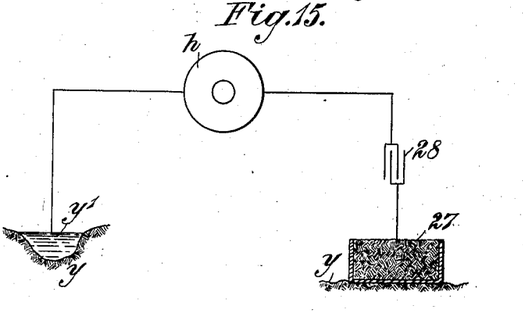

The terminals of each receiving instrument $h$ should also be connected to earth or water or earth and water at a distance apart not less than that stated in order to obtain the best results. Where it is not convenient to place the connections of the terminals of the secondary winding $b$ of each transmitting instrument or each receiving instrument to earth or water or earth and water at the distance apart mentioned, one of them may, as shown in Fig. 13, be connected to earth $y$ or water $y'$ and the other to an insulated capacity 27—as, for example, an insulated mass of moist earth or metal. In the case of each receiving instrument an ordinary electrical condenser may be used in addition to the insulated capacity 27 above mentioned. Such a condenser 28 may be placed between earth $y$ and one terminal of the receiving instrument $h$, as shown in Fig. 14, or when an insulated capacity 27 of the kind above mentioned is used then between one terminal of the receiving instrument and such insulated capacity 27, as shown in Fig. 15.

To enable telegraphic apparatus of the kind hereinbefore described to be also used when desired for sending telephonic messages, there is used in conjunction with the transmitting instrument vocally-operated means for varying the current passing through the primary winding $a$ of the induction-coil and setting up corresponding current variations or pulsations in the secondary winding $b$ of the said coil, and in conjunction with each of the telegraphic receiving instruments $h$ there is provided a suitable telephone-receiver.

Figure 16:
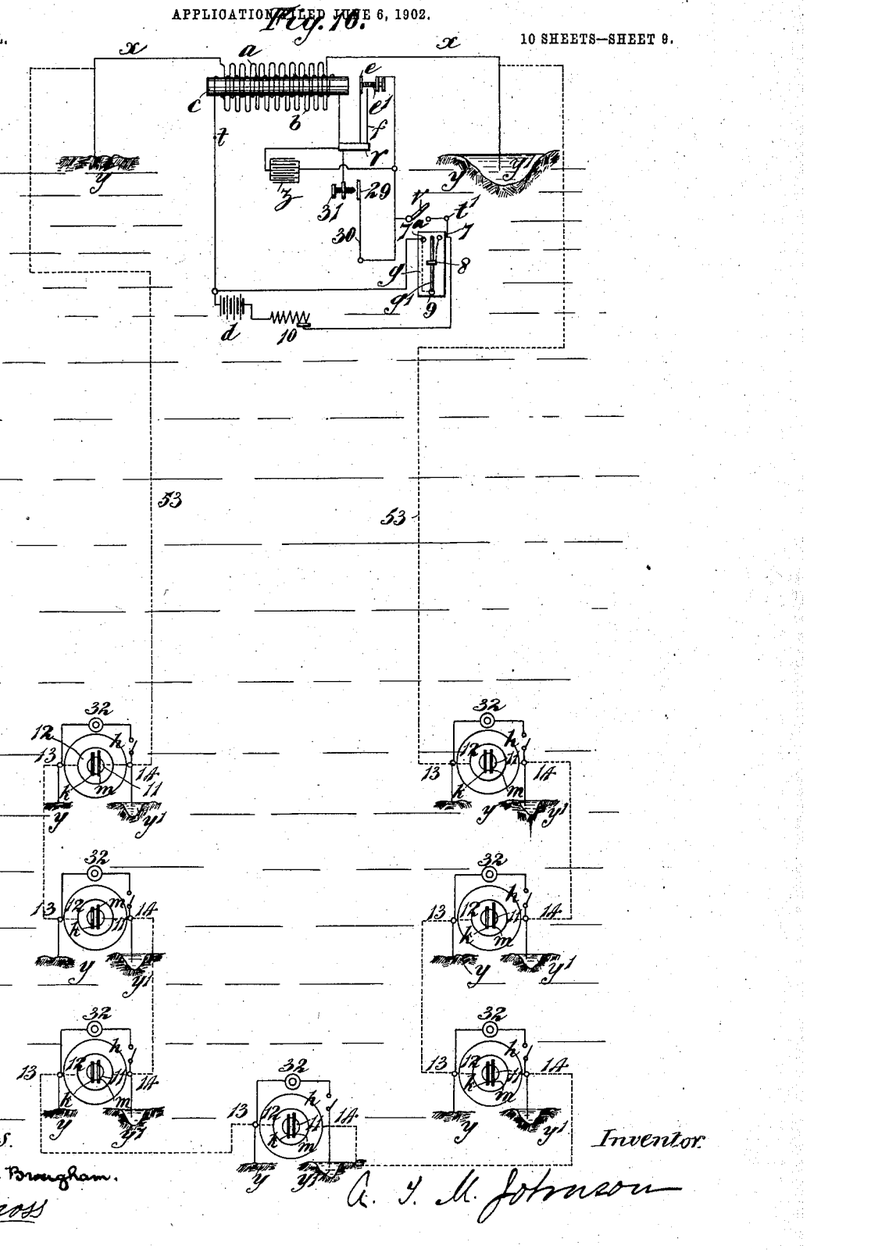

Fig. 16 is a diagram of apparatus similar to that shown in Fig. 1, but adapted for sending both telegraphic and telephonic messages. In this arrangement the telephone-transmitter comprises a disk or diaphragm 29, carried by a holder—for example, a spring-blade 30—and an adjustable contact 31, that can be caused to bear against the said disk, so as to form therewith, when vocal sounds are caused to impinge on the said disk, a circuit maker and breaker or regulator for closing and opening or varying the circuit of the primary winding $a$ when the apparatus is to be used for sending telephonic messages. The telephonic receiver 32, used in connection with each telegraphic receiving instrument $h$, may be of ordinary kind, but is preferably of the watch form shown in Fig. 21 and has the terminals $32^a$ $32^b$ of its electromagnet $32^c$ arranged to be connected to earth or water or, as shown, one to earth, $y$, and one to water, $y'$,—as, for example, through the terminal connections of the corresponding telegraphic receiving instruments $h$. The arrangement is such that upon moving the contact 31 away from the disk 29 and closing the switch $v$ the apparatus can be used in the manner hereinbefore described for sending general or secret telegraphic messages, and upon withdrawing the contact-screw $e'$ from the adjacent speaking-reed $e$ and moving the contact 31 against the vocal disk 29 and speaking against the latter the apparatus can be used for sending telephonic messages, the action of this contact maker and breaker or regulator 29 31 on the current then flowing through the primary winding $a$, producing in the secondary winding $b$ corresponding secondary currents that will be transmitted to the telephone-receivers 32, which will reproduce the vocal sounds.

The disk 29 and adjustable contact 31 can be arranged in various ways to be brought into the circuit of the primary winding $a$ when telephonic messages are to be sent. In Figs. 2, 3, and 4 the disk 29 is held around its periphery in a metal case 33, that is provided with a perforated front cover 34 and mouthpiece 35, and is carried by an extension 36 of the metal pillar $q$, with which it is in electrical connection. The contact 31 is formed by one arm of a metal lever that is pivoted to an extension 37 of the metal pillar $s$ and to the other arm $31^a$ of which is connected an adjustable spring 39, whereby the contact 31 can be caused to bear against the disk 29 with just sufficient pressure to admit of the rapid making and breaking of the circuit of the primary winding $a$ at this point when vocal sounds are caused to impinge on the disk. When the apparatus is to be used for sending telegraphic messages, the disk 29 and contact 31 are moved apart by any suitable means—as, for example, by a cam 40, that is adapted by partial rotation to act against the lever-arm $31^a$ and move the contact 31 away from the disk 29. (See dotted lines in Fig. 2.)

Figure 5:
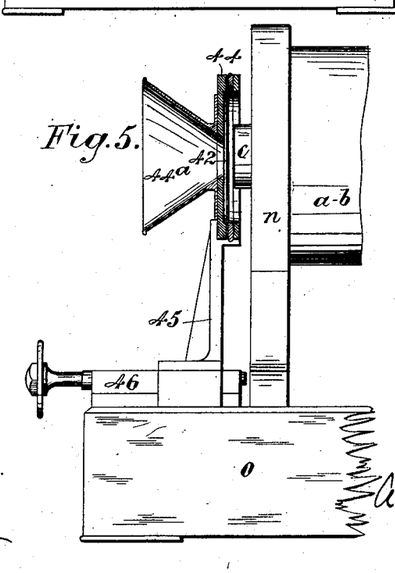
Figs. 5 and 5ª show, partly in side elevation and partly in longitudinal central section, modified arrangements of the transmitting instrument.
Figure 5A:
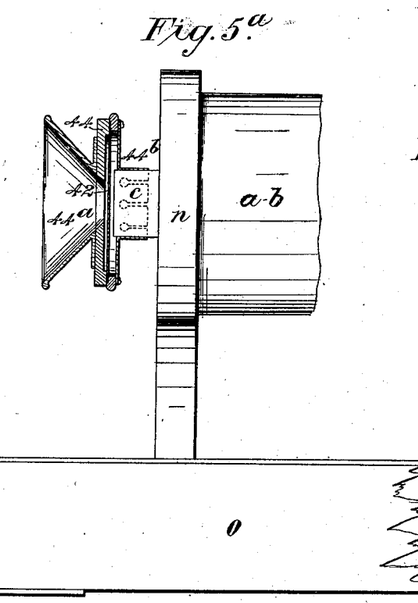
Figures 17, 18, 19, 20, 21:
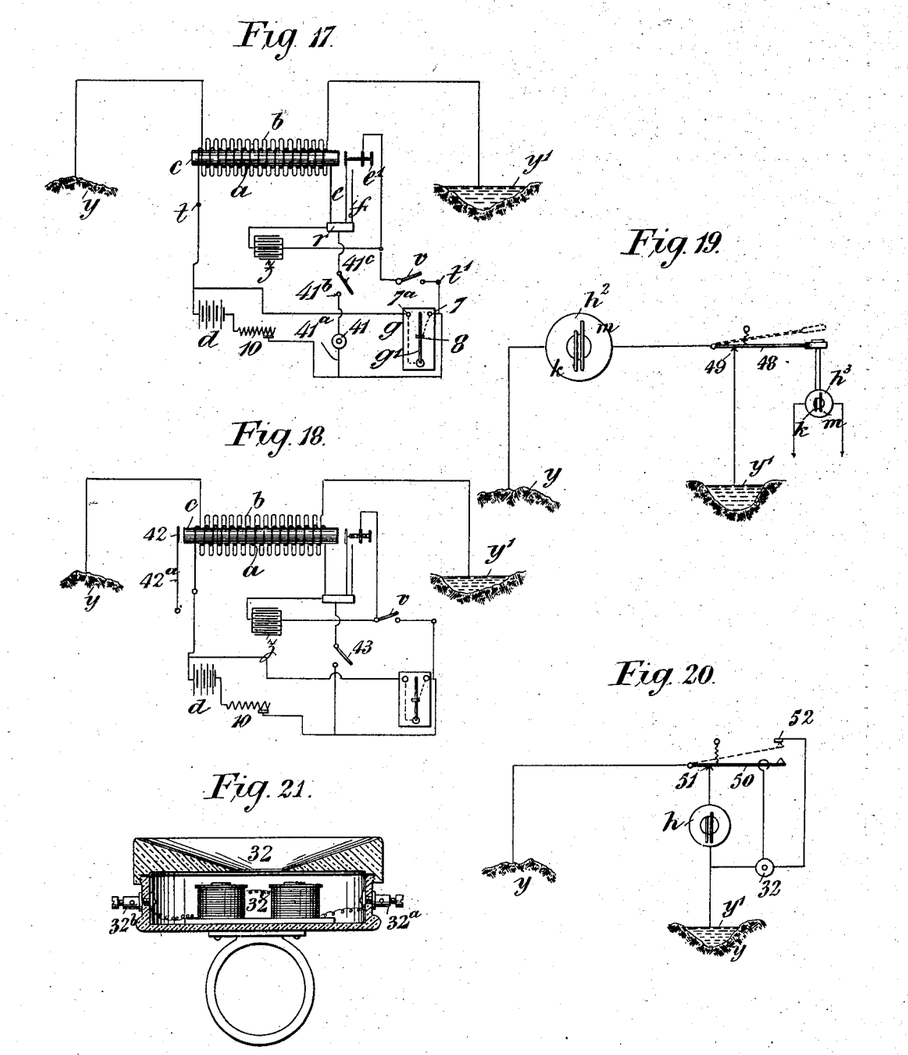

Fig. 17 shows a modified arrangement wherein a microphone-transmitter 41, such as an ordinary Hunnings microphone-transmitter, is arranged to be brought into the circuit of the primary winding $a$. This can be done in various ways—as, for example, by connecting the telephonic transmitter 41 to a conductor $41^a$, that is connected at one end to the same pole of the generator $d$ as the terminal $t'$ and at the other end to a contact $41^b$, that can be connected by a switch-lever $41^c$ to the pillar-support $r$, to which one end of the primary winding $a$ is connected. The arrangement is such that when the switch-lever $41^c$ is open and the switch $v$ closed the apparatus can be used as before for sending general or secret telegraphic messages to the telegraphic instruments $h$, and upon opening the switch $v$ and closing the switch-lever $41^c$ and speaking onto the telephone-transmitter 41 variations or pulsations will be set up in the current then flowing through the primary winding $a$, so as to produce in the secondary winding $b$ corresponding secondary currents that will be transmitted to the telephone-receivers 32, which will reproduce the original vocal sounds. In some cases, and as shown in Fig. 18, a vocal disk 42 of thin sheet-iron carried by a reed $42^a$ may, for the purpose of sending telephonic messages, be arranged to vibrate in front of the core $c$ of the induction-coil $a\ b\ c$, so that when vocal sounds impinge on the disk the latter will by vibrating in the magnetic field of the core $c$ set up an undulating current in the primary winding $a$, and also, consequently, in the secondary winding $b$ of the coil, which will be transmitted to the telephonic receivers, as in the other arrangements hereinbefore described. In this case when telephonic messages are to be sent the circuit of the primary winding $a$ is closed through a switch 43 and the switch $v$ opened. Instead of mounting the iron disk 42 on a reed $42^a$, Fig. 18, it may, as shown in Fig. 5, be fixed around its periphery in an annular holder 44, that is provided with a mouthpiece $44^a$, and carried by a support 45, that is adjustable on a support 46 toward and from the core $c$, or the said holder may, as shown in Fig. $5^a$, be provided with a tubular extension $44^b$, adapted to slide on the core $c$ to adjust the normal distance of the iron disk 42 from the end thereof.

The operation of the apparatus is as follows: When it is desired to send a general telegraphic message to a number of receiving instruments, the tuning-reed $f$ whose rate of vibration corresponds to the master-reeds in all the receiving instruments is brought into position for use and the corresponding speaking-reed $e$ is brought, between the contact-screw $e'$ and the adjacent end of the core $c$, the distance of the said speaking-reed from the said core being adjusted, if necessary, by adjustment of the pillar $s$ on the support $r$. The contact-screw $e'$ is then caused to bear against the speaking-reed and is adjusted either longitudinally by rotating it or laterally by moving the pillar $q$ on its support $p$ until the speaking-reed $e$ vibrates at a rate corresponding to the pitch of the adjacent tuning-reed $f$, which will be determined by the said tuning-reed being sympathetically set in vibration. When this rate of vibration has been attained, the pitch of the electrical impulses sent to the receiving instruments $h$ by the action of the primary winding $a$ on the secondary winding $b$ will correspond to the pitch of the master-reeds in the receiving instruments which will be set in action, and then by suitably operating the key $g$ a telegraphic message, according to the Morse or other desired code, can be sent to the receiving instruments.

When it is desired to send a secret telegraphic message to any one of the receiving instruments, the rotary reed-carrier 1 is turned round until the tuning-reed $f$, whose pitch corresponds to that of the secret reed in the particular receiving instrument to which it is desired to telegraph, is brought into a position in which the corresponding speaking-reed $e$ will be between the core $c$ and contact-screw $e'$, when the said screw is again adjusted until the new speaking and tuning reeds are caused to vibrate at the required rate, when a telegraphic message is again sent by operating the key $g$.

When it is desired to send a telephonic message, a telegraphic message is first sent to that effect, as hereinbefore described, to the telegraphic receiving instrument $h$ or each of such instruments, which also acts as an alarm or call device, whereupon the person in charge of the telegraphic receiving instrument connects a telephonic receiver 32, Fig. 16, in shunt across the terminal connections of the telegraphic receiving instrument $h$. The contact-screw $e'$ is then moved back into an inoperative position and the circuit of the primary winding $a$ closed in one or other of the ways hereinbefore described, whereupon a telephonic message can be sent to the telephonic receiver or receivers by speaking onto the disk 29, Figs. 2, 3, and 4 and 16, or onto microphone-transmitter 41, Fig. 17, or onto the iron disk 42, Figs. 5, $5^a$, and 18.

After receiving the telephonic message the telephonic receiver 32 is disconnected from the telegraphic receiving instrument $h$, so as to leave the latter ready to again receive a telegraphic message.

By the means hereinbefore described it will be understood that only the person or persons to whom a secret telegraphic message has been previously sent will at any moment know that a telephonic message is to be sent to him.

If desired, two telegraphic receiving instruments may, as shown in Fig. 19, be provided at each of the places between which communication is to be made, one—viz., $h^2$—being of the cylinder or loud-sounding type (shown in Figs. 6 and 7) to act more as an alarm or call device, and the other—viz., $h^3$—being of the watch-receiver type, (shown in Figs. 8, 9, and 10,) by which a telegraphic message will practically only be heard by the person intended to receive the message putting the receiver to his ear or standing near to the receiver. In this case the loud-sounding receiver $h^2$ may be arranged to be switched off when the other is used, so that after the attention of a person has been obtained by means of the loud-speaking receiving-receiver $h^2$ a secret message may be sent to and received by the secret reed $m$ in the watch-receiver $h^3$. For this purpose the receiver $h^3$ may be normally supported by a spring-lever 48, that is held against a contact 49 by the weight of the receiver $h^3$, but will be allowed to leave the contact 49, as shown in dotted lines, when the receiver $h^3$ is removed from such lever for use.

The terminal connections of the telegraphic and telephonic receiving instruments $h$ and 32, respectively, may also be similarly arranged, as shown in Fig. 20, so that by merely moving the latter instrument from a spring-lever 50 to bring it into position for use the said lever 50 will automatically rise and put the former instrument *h* out of action by opening the circuit thereof at 51 and close the circuit of the latter instrument 32 at 52, the connections being reversed when the latter instrument is put back into its inoperative position.

Instead of dispensing with metallic conductors between the transmitting and receiving instruments and depending upon the earth conduction, as in the arrangements hereinbefore described, metallic conductors may, if desired, be used between the several instruments, as indicated by the dotted lines 53 in Fig. 16.

What I claim is—

1. In apparatus for electrically transmitting and receiving messages, the combination with an electrical transmitting instrument having a secondary winding and means adapted to produce electrical impulses in said secondary winding at different rates, of a number of receiving instruments each adapted to be operated by electrical impulses of two different rates, from said transmitting instrument, one rate being common to all the receiving instruments, and the other specific to the particular receiving instrument, and a connecting medium between the terminals of the said secondary winding and of the receiving instruments.

2. In apparatus for electrically transmitting and receiving messages, the combination with an electrical transmitting instrument having a secondary winding and means adapted to produce electrical impulses in said secondary winding at different rates, of a number of receiving instruments each comprising an electromagnetic device having its terminals arranged to receive electrical impulses sent from said transmitting instrument, and master and secret message reeds of different pitch adapted to be respectively operated by said electromagnetic device when the same is energized by electrical impulses of corresponding pitch.

3. For electrically transmitting and receiving messages without connecting-wires between the transmitting and receiving stations, the combination with an electrical transmitting instrument comprising primary and secondary windings and a magnetic core, an adjustable contact opposite said core, and a number of pairs of tuning and speaking reeds of different pitch, each pair of reeds being adapted to be brought into a position in which the speaking-reed of the pair will be between said core and adjustable contact and can be used in conjunction with said contact as a circuit maker and breaker for the primary winding, of an electric generator, a circuit-controlling device whereby said primary winding can be placed in series and shunt circuit alternately with said electric generator, a number of receiving instruments each adapted to be operated by electrical impulses of two different rates from said secondary winding, and a non-metallic connecting medium between the terminals of said secondary winding and the terminals of said receiving instruments.

4. For electrically transmitting and receiving messages without connecting-wires between the transmitting and receiving stations, the combination with an electrical transmitting instrument comprising primary and secondary windings and a magnetic core, an adjustable contact opposite said core, and a number of pairs of tuning and speaking reeds of different pitch, each pair of reeds being adapted to be brought into a position in which the speaking-reed of the pair will be between said core and adjustable contact and can be used in conjunction with said contact as a circuit maker and breaker for the primary winding, of an electric generator, a circuit-controlling device whereby said primary winding can be placed in series and shunt circuit alternately with said electric generator, a number of receiving instruments each comprising an electromagnetic device and a pair of reeds arranged to be operated by said electromagnetic device and each tuned to vibrate at a different rate to the other, and a non-metallic connecting medium between the terminals of said secondary winding and the terminals of the receiving instruments, substantially as described for the purpose specified.

5. Apparatus for electrically transmitting and receiving telegraphic or telephonic messages at will, comprising an induction-coil, means whereby electrical impulses of different but definite rates can be set up in the secondary winding of said coil for sending telegraphic messages, means whereby electrical impulses corresponding to the vibrations of vocal sounds can be set up in said secondary winding for sending telephonic messages, telegraphic and telephonic receiving instruments adapted to respectively receive the telegraphic and telephonic messages, and a connecting medium between the terminals of said secondary winding and of said receiving instruments.

6. Apparatus for electrically transmitting telegraphic or telephonic messages at will, comprising an induction-coil, means whereby electrical impulses of different but definite rates can be set up in the secondary winding of said coil for sending telegraphic messages, means whereby electrical impulses corresponding to the vibrations of vocal sounds can be set up in said secondary winding for sending telephonic messages, telegraphic receiving instruments each adapted to be operated by electrical impulses of two different rates from said transmitting instrument, telephonic receiving instruments arranged adjacent to said telegraphic receiving instruments, and a connecting medium between the terminals of said secondary winding and of the telegraphic and telephonic receiving instruments.

7. Apparatus for electrically transmitting telegraphic or telephonic messages at will, comprising an induction-coil, means whereby electrical impulses of different but definite rates can be set up in the secondary winding of said coil for sending telegraphic messages, means whereby electrical impulses corresponding to the vibrations of vocal sounds can be set up in said secondary winding for sending telephonic messages, telegraphic receiving instruments each comprising an electromagnetic device having its terminals arranged to receive electrical impulses sent from said transmitting instrument, and master and secret message reeds of different pitch adapted to be respectively operated by said electromagnetic device when the same is energized by electrical impulses of corresponding pitch, telephonic receiving instruments normally in open circuit but adapted to be connected to the terminal connections of said telegraphic instruments, and a connecting medium between the terminals of said secondary winding and of the telegraphic receiving instruments.

8. Apparatus for electrically transmitting telegraphic or telephonic messages at will, comprising an induction-coil, an electric generator, a circuit making and breaking device whereby the circuit of the primary winding of said coil can be made and broken at different but definite rates, a switch and connections for completing the circuit of said primary winding through said electric generator and circuit making and breaking device, a circuit-controller whereby said electric generator can be short-circuited without opening the circuit of said primary winding, a telephonic transmitter, a switch and connections for completing the circuit of said primary winding through said telephonic transmitter and electric generator independently of said circuit making and breaking device, telegraphic and telephonic receiving instruments adapted to respectively respond to telegraphic and telephonic impulses set up in the secondary winding of said induction-coil, and connecting means between the terminals of said secondary winding and of the receiving instruments.

9. Apparatus for electrically transmitting telegraphic or telephonic messages, at will, comprising an induction-coil having an iron core, an electric generator having one of its poles connected to one end of the primary winding, an adjustable contact arranged opposite said core, a switch and connections whereby said contact can be placed in connection with the other pole of said electric generator, a support connected to the second end of said primary winding, a number of pairs of tuning and speaking reeds carried by said support and adapted to vibrate at different pitches, each pair of reeds being adapted to be brought into a position in which the speaking-reed of the pair will form in conjunction with said adjustable contact, a contact making and breaking device for said primary winding, a microphone-transmitter, a second switch and electrical connection whereby said microphone can be included in the circuit of said primary winding and electric generator independently of the first switch and connection and circuit maker and breaker, a circuit-controller adapted to short-circuit said electric generator without affecting the circuit of said primary winding, telegraphic receiving instruments each adapted to respond to electrical impulses of two different pitches, telephonic receiving instruments, and connecting means between the terminals of said secondary winding and of said receiving instruments.

10. Apparatus for electrically transmitting telegraphic or telephonic messages at will without connecting-wires between the transmitting and receiving stations, comprising an induction-coil having an iron core, an electric generator, means for making and breaking the circuit of the primary winding, of said coil and said electric generator at different but definite rates, a telephonic transmitter and switch and electrical connections whereby said telephonic transmitter can be placed in circuit with said primary winding and electric generator independently of said circuit making and breaking means, telegraphic receiving instruments each adapted to respond to electrical impulses of two different rates, non-metallic connecting means between the terminals of the secondary winding of said coil and the terminals of said telephonic receiving instruments, telephonic receivers, each arranged adjacent to one of said telegraphic receiving instruments, and switches each of which is normally held by the corresponding telephonic receiver in a position to close the circuit of the telegraphic receiving instrument and open the circuit of the telephonic receiver and when released to open the circuit of the telegraphic receiving instrument and close that of the telephonic receiver, substantially as described.

11. In apparatus of the kind herein referred to for electrically transmitting messages, a transmitting instrument comprising an induction-coil having an iron core, two terminals one of which is connected to one end of the primary winding of said coil, an endwise-adjustable contact-screw arranged opposite one end of said core, an adjustable support carrying said contact-screw and adapted to move the same in a direction transverse to the axis of said core, a switch whereby said contact-support can be connected and disconnected from the second terminal, a tunable musical trembler or multiphone comprising a number of pairs of tuning and speaking reeds adapted to vibrate at different rates and arranged to be brought in succession between said core and contact-screw, a longitudinally-adjustable support carrying said trembler or multiphone and whereby the same can be moved in a direction toward and from said core, said longitudinally-adjustable support being connected to the second end of said primary winding, and means for rotating said trembler or multiphone, substantially as described.

12. In an instrument for electrically transmitting electrical impulses of different but definite rates, a multiphone comprising a movable carrier, and a number of pairs of tuning and speaking reeds fixed at one end to said carrier and adapted to vibrate at different rates, the two reeds in each pair being arranged in different planes, substantially as described for the purpose set forth.

13. In an instrument for electrically transmitting electrical impulses of different but definite rates, a multiphone comprising a movable carrier, and a number of pairs of tuning and speaking reeds fixed at one end to said carrier and adapted to vibrate at different rates, the two reeds in each pair being arranged in different planes and so as to overlap one another, substantially as described for the purpose specified.

14. In an instrument for electrically transmitting electrical impulses of different but definite rates, a multiphone comprising a movable carrier, and a number of pairs of tuning and speaking reeds fixed at one end to said carrier and adapted to vibrate at different rates, the free end of each speaking-reed being provided with an enlarged portion of sheet-iron, substantially as described for the purpose specified.

15. An instrument for receiving electrical impulses of different rates and thereby producing different sounds, comprising an electromagnet the terminals of whose winding are arranged to receive the electrical impulses, two reeds tuned to vibrate at different pitches and arranged across but at a short distance from the poles of said electromagnet, and a permanent magnet arranged to magnetize the core of said electromagnet, substantially as described.

16. An instrument for receiving electrical impulses of different rates and thereby producing different sounds, comprising an electromagnet the terminals of whose winding are arranged to receive the electrical impulses, two reeds tuned to vibrate at different pitches and arranged across but at a short distance from the poles of said electromagnet, a permanent magnet arranged to magnetize the core of said electromagnet, a holder for said electromagnet, reeds, and permanent magnet, a separate support upon which said holder is adjustably mounted, a tuning-fork carried by said support extending across said reeds and adapted to vibrate at the same pitch as one of said reeds, and a resonant cylinder or casing inclosing the above-mentioned parts, substantially as described.

17. In apparatus for electrically transmitting messages from one place to another without connecting-wires between the said places, a transmitting instrument comprising an induction-coil and means for setting up electrical impulses of different but definite rates in the secondary winding thereof, receiving instruments each adapted to receive electrical impulses of two different rates, and earth between said transmitting and receiving instruments, the terminal connections of said secondary winding being connected one to earth and the other to an insulated capacity resting on an earthed support, substantially as described, for the purpose specified.

18. In apparatus for electrically transmitting messages from one place to another without connecting-wires between the said places, a transmitting instrument comprising an induction-coil and means for setting up electrical impulses of different but definite rates in the secondary winding thereof, receiving instruments each adapted to receive electrical impulses of two different rates, and earth between said transmitting and receiving instruments, the terminal connections of each of said receiving instruments being connected one to earth and one to an insulated capacity resting upon an earthed support, substantially as described.

19. In apparatus for electrically transmitting messages from one place to another without connecting-wires between the said places, a transmitting instrument comprising an induction-coil and means for setting up electrical impulses of different but definite rates in the secondary winding thereof, receiving instruments each adapted to receive electrical impulses of two different rates, and earth between said transmitting and receiving instruments, the terminal connections of each of said receiving instruments being connected one to earth and one to an insulated capacity resting upon an earthed support, and a condenser arranged in one of said terminal connections.

20. In apparatus for electrically transmitting messages from one place to another without connecting-wires between the said places, a transmitting instrument comprising an induction-coil and means for setting up electrical impulses of different but definite rates in the secondary winding thereof, receiving instruments, and earth between the terminal connections of said transmitting and receiving instruments, each receiving instrument comprising a loud-sounding portion adapted to respond to electrical impulses of a definite rate, a low-sounding portion also adapted to respond to electrical impulses of a definite rate, and a switch that normally closes the circuit of the loud-sounding portion and opens that of the low-sounding portion of each receiving instrument and opens the circuit of the former and closes that of the latter when the latter is moved into position for use, substantially as described.

Signed at 77 Cornhill, in the city of London, England, this 8th day of May, 1902.

ARTHUR THOMAS METCALF JOHNSON.

Witnesses:
WM. O. BROWN,
PERCY E. MATTOCKS.